Patented Mar. 11, 1930

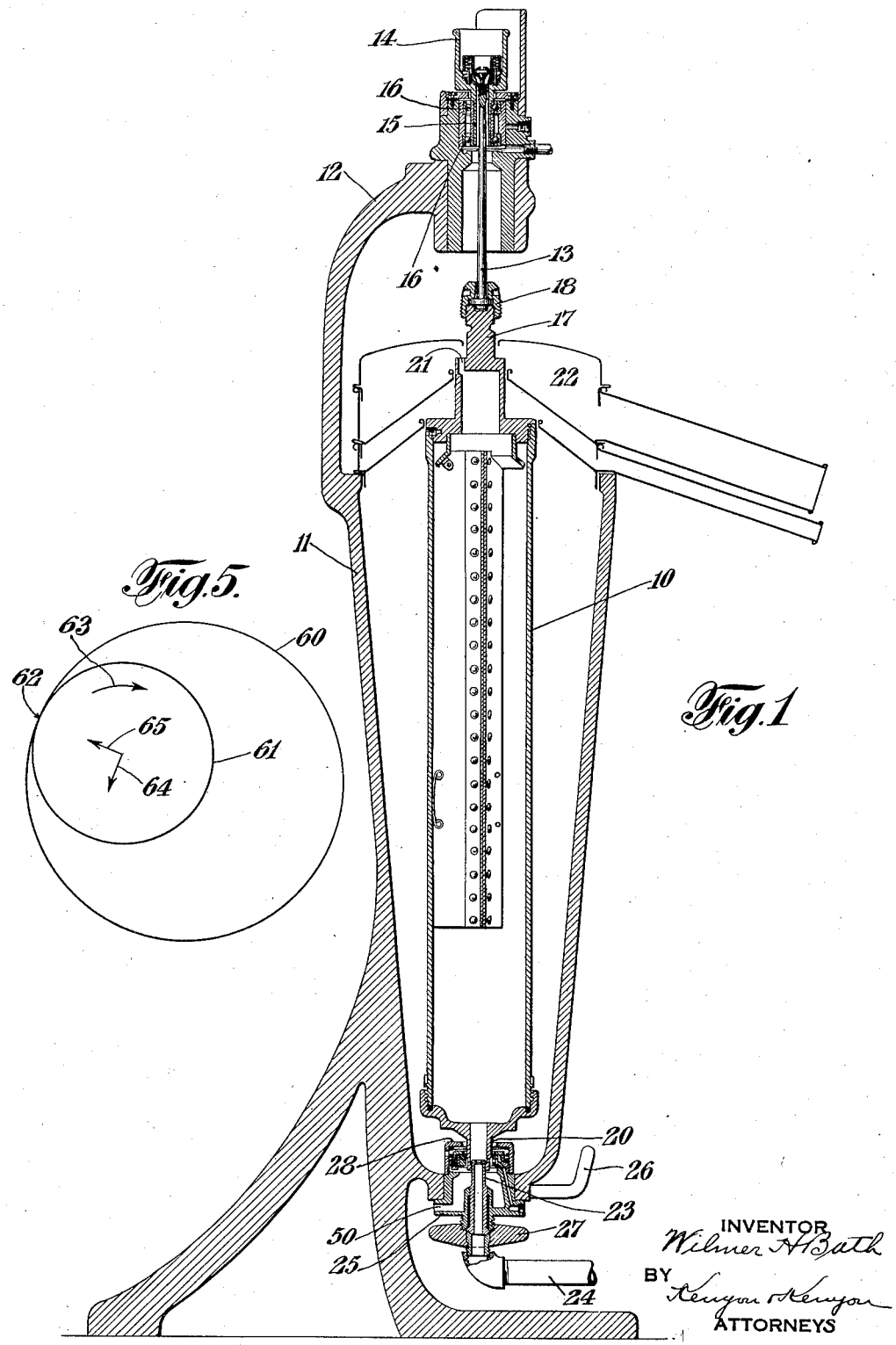

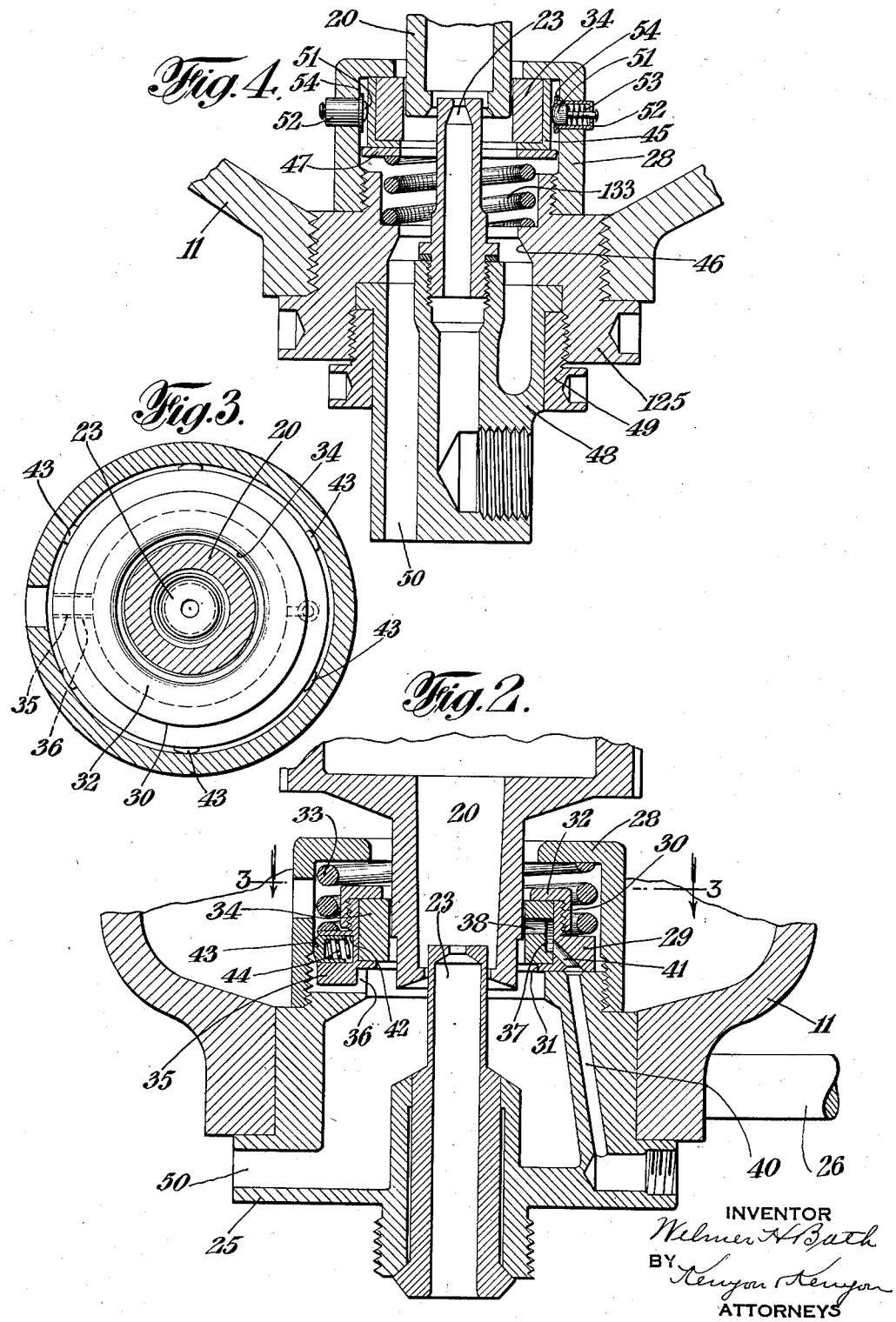

1,750,154

UNITED STATES PATENT OFFICE

WILMER H. BATH, OF WEST CONSHOHOCKEN, PENNSYLVANIA, ASSIGNOR TO THE SHARPLES SPECIALTY COMPANY, OF PHILADELPHIA, PENNSYLVANIA, A CORPORATION OF DELAWARE

CENTRIFUGAL MACHINE

Application filed December 5, 1928. Serial No. 323,881.

This invention relates to centrifugal machines and particularly to means for guiding or centering rotating parts thereof or for limiting the movement of such parts in a direction substantially normal to their axis of rotation.

The problems encountered in supporting and centering centrifugal machines and in guiding them or parts of them and in limiting the extent of motion of them or of parts of them in a direction substantially normal to their axis of rotation during rotation of them, vary considerably with the conditions of operation. If a body is caused to rotate while unrestrained by supports or bearings, it will rotate about a natural or principal axis. The principal axes of a body are axes which pass through its center of mass and about which the body has either a maximum or a minimum moment of inertia. If a body is constrained to rotate about a geometrical axis, the body will be in balance when that geometrical axis coincides with a principal axis of the body; and the body will be in a state of unbalance when that geometrical axis does not coincide with a principal axis of the body, either because it forms an angle with all principal axes or does not pass through the center of mass. Unbalance of some bodies may be conveniently overcome by adding material to or removing it from suitable parts of the body. When a body in a state of unbalance is rotated in fixed bearings, resulting unbalanced centrifugal force produces a stress upon the bearings that is proportional to the square of the speed of rotation. When the mass and speed are small it is possible to construct bearings to resist such a stress. The centrifugal force, due to the unbalanced condition, may become so great as to distort the shaft even though it be made as strong and rigid as is practicably possible. This may carry the center of mass out of or farther from the axis of the bearings and tend to produce "whipping". An unbalanced condition leads to vibration or oscillation of the bearings and their supports. Thus it is possible to mount upon a rigid spindle carried in fixed bearings, a centrifuge rotating as high as 500 R. P. M. It is impractical to support in rigid bearings centrifugal rotors having a diameter of one foot and rotated at a speed of 6,000 R. P. M. or rotors having a diameter of four and one-half inches and a speed of 15,000 R. P. M. In the supporting of centrifugals rotating at such higher speeds resort is made to yielding and self-aligning bearings with a view to permitting the rotor to rotate about a principal axis even though such axis is not coincident with the geometrical axis of the rotor or of the bearings. With such mountings the forces involved in the centering or guiding of the rotating body are not the result of centrifugal force resulting from the eccentric rotation of the center of mass but are only the forces required to displace the bearing, during the rotation of the body, through a distance equal to the eccentricity of the journal surface on the rotating member with respect to a principal axis of the rotor. Also in the supporting of centrifugal rotors rotating at such higher speeds resort is made to the use of flexible spindles that permit the rotor to rotate about a principal or natural axis that is not coincident with the geometrical axis of the rotor. If such a flexible spindle is supported in a rigid bearing the forces developed are those required to bend or otherwise distort the spindle sufficiently to bring the principal axis of the rotating member into coincidence with the axis of the bearing or bearings. In centrifugal machines of the type shown in Sharples Patent No. 1,277,653, issued September 3rd, 1918, the rotor is supported by means of a flexible spindle carried in a self-aligning bearing and the rotating system is flexible; and a part of that system is centered or guided and radial motion of it during rotation is limited by a device commonly called a "drag" and of which an example is shown in Sharples Patent No. 1,445,722, issued February 20th, 1923. In such a construction the spindle is flexible and is mounted to permit its angular misalignment with respect to the driving member and the flexibility of the spindle and the clearance of the drag, and in extreme cases the yielding action of the drag, permit the rotor to rotate about a natural or principal axis. The resistance of the spindle to flexure and the restraining action of the drag tend to limit the radial motion of the rotating system and prevent destruction thereof that might result from erratic and eccentric motion of the rotor. With constructions like those shown in the above mentioned patents rotational speeds of 15,000 R. P. M. have been extensively used commercially with centrifugal bowls thirty inches long and four and one-half inches in diameter, and smaller laboratory machines have been operated successfully at 40,000 R. P. M.

However, when a centrifugal machine of the type shown in the first above mentioned patent is provided with a guide or drag of the type shown in the second above mentioned patent, pronounced vibrations sometimes occur in the guide or drag. A complete analysis of the causes and characteristics of such vibration is difficult if not impossible. However, it is to be noted in a study of the conditions existing in a high speed centrifuge that in addition to the unbalance due to lack of coincidence of the geometrical axis with a principal axis as the result of an excess of mass in some part of the rotor, the accumulation of solids in the rotor changes its balance during operation. Moreover, gyroscopic motions and forces occur in high speed operation of centrifuges. Also, while it is possible to provide sufficient clearance between the bowl and the part of the drag which engages the bowl, to permit such eccentric rotation of the bowl as is due to moderate unbalance, greater eccentricity of rotation due to greater unbalance causes one side of the bowl or of some part thereof to engage the guide producing friction and causing a reaction toward the axis and a gyroscopic moment results and tends to increase the pressure of contact and therefore the friction. Apparently this condition is sufficient to cause a planetation within the guide of that part of the bowl lying therein, violent vibration following as a result. Moreover, it is my opinion that stationary or other types of waves develop in the liquid in the rotor as a result of the rotation or of the vibration or of the oscillation of the bowl through a fixed or varying path or orbit, and that such waves apply large and uncontrollable impulses to the bowl and cause vibration and oscillation of the bowl and of parts acting to guide or center it. Extensive efforts have been made to avoid vibration and oscillation of the rotor by providing the best possible lubrication, but the avoidance of such vibration by most careful lubrication is not always possible and in any event is only temporary.

In constructions like the devices shown in the above mentioned patents, in which the rotor is fed through a boss at the bottom of the bowl and means employed for centering acts upon that boss, the opening in the boss must be large enough to permit some motion of the bowl without mis-alignment of the boss with the feed nozzle, and there is a limitation upon the types of bearings that can be employed at the high speed of rotation involved in connection with a boss having the necessary diameter.

It is an object of this invention to provide a centrifugal machine, and particularly a centrifugal machine embodying a flexible rotating system, in which the system is so guided that vibration due to the guiding means is minimized.

Other and further objects and advantages of my invention will appear from the following description of one embodiment of my invention that is set forth in great detail in order that my invention may be fully understood but with the intention that my invention is not limited to the details described.

In the drawings in which like reference characters indicate similar parts,

Fig. 1 is a vertical sectional view of a centrifugal machine embodying my invention;

Fig. 2 is a vertical sectional view showing on an enlarged scale the drag mechanism shown in Fig. 1;

Fig. 3 is a sectional view on the line 3—3 of Fig. 2;

Fig. 4 is a vertical sectional view of a modification; and

Fig. 5 shows diagrammatically the theoretical action of some of the forces involved in the action of the guiding member or drag.

Referring to the drawings, a centrifugal rotor 10 is carried by a support or casing 11. In the construction shown casing 11 is provided with a bearing bracket 12 in which the rotor 10 is supported by a flexible spindle 13. In the construction shown the pulley 14, capable of being driven by a belt, or some other form of prime mover, is provided with a quill 15 that is supported in the bracket 12 by bearings 16. Spindle 13 is so supported, in prime mover 14, for example, as shown in the copending application of Arthur U. Ayres, Serial No. 20,961, filed April 6th, 1925, that the spindle 13 is driven by prime mover 14 but is free to move to positions in which it is in axial misalignment with prime mover 14. In the construction shown rotor 10 is provided with a stem 17 that is firmly connected with spindle 13, as by nut 18.

The lower end of the bowl is provided with an inlet boss 20. The bowl shown is of the clarifier type, and is provided with a liquid outlet 21 which discharges into a compartment 22 of usual construction. A supply nozzle 23 feeds into the boss 20, and into the bowl, whatever substance is fed through supply pipe 24.

Referring more particularly to Figs. 1 and 2, the casing 10 is shown broken away and is provided with a drag plug 25 which may be held in place in any manner as by a rotatable key 26 more particularly described in Patent No. 1,445,772, above mentioned. Within a central recess of the plug 25 the nozzle 23 is held in place and the supply pipe 24 is joined to said nozzle by a nut 27.

A shell or housing 28 is secured to the plug 25, as by being threaded thereon. Within shell 28 ring 29 rests upon the upper surface of plug 25. A second ring 30 is threaded to ring 29. Between flange 31 of ring 29 and flange 32 of ring 30 there is gripped a bushing 34 which may be of any suitable material such as babbitt or lubricant-impregnated wood, this bushing surrounding, preferably with slight clearance, boss 20 of the bowl.

Coil spring 33 is in compression between the upper wall of housing 28 and the upper surface of the outwardly extending flange of ring 29. Thus, the drag member, comprising ring 29, ring 30 and bushing 31, is pressed against its seat upon the upper surface of plug 25 and lateral motion with respect to the axis of the rotor is frictionally resisted. Lug 35 depends from the lower face of ring 29 into slot 36 formed in the upper face of plug 25, to prevent rotation of the drag member with boss 20. Bushing 34 is provided with a recess 37 from which passage 38 leads to the inner face of the bushing. A lubricant passage 40 through plug 25 leads to passage 41 in ring 29, passage 41 communicating with recess 37. Between the outer surface of ring 29 and the inner surface of housing 28 there is a clearance in which the drag member moves against the frictional resistance due to contact between the lower face of ring 29 and the upper face of plug 25, that frictional resistance being increased by the pressure of spring 33 which increases the pressure between the two frictionally engaging surfaces.

The movement of ring 29 that is permitted by the clearance between ring 29 and housing 28 is not only so resisted frictionally but it is cushioned. In the outer periphery of ring 29 are radially positioned recesses 42 within which slide plungers 43 that engage the inner wall of housing 28 and are pressed outwardly by springs 44 contained in recesses 42.

In the construction shown in Fig. 4 the bushing 34 is enclosed in a ferrule 45 and it is pressed against the lower side of the upper wall of housing 28 by spring 133 which is seated upon the inwardly projecting ledge 46 of the plug 125 that is threaded into the lower end of the bowl support 11. Advantageously an annular plate or washer 47 lies between spring 133 and the lower face of ferrule 45. In this construction a supply and drain member 48 is held into plug 125, in desired rotational adjustment, by nut 49. Supply nozzle 23 is carried by member 48, and member 48 includes a drain passage 50.

Between ferrule 45 and the inner wall of housing 28 there is a clearance within which bushing 34 and its ferrule 45 move under the frictional resistance due to the friction between the upper wall of housing 28 and the upper face of bushing 34 and between spring 133, washer 47 and the lower face of ferrule 45, this frictional resistance being increased by the pressure between those faces that is produced by the force of spring 133.

The movement of bushing 34 against the frictional resistance is cushioned. In the form shown in Fig. 4 the cushioned means consists of plungers 51 which engage the outer surface of ferrule 45 and are carried in casings 52 which are positioned in openings in housing 28 and in which are enclosed springs 53 acting upon plungers 51. Casings 52 have formed on them a flange 54 which engages the inner face of housing 28 and prevents casings 52 from being pushed outwardly through the holes in housing 28 in which casings 52 are supported.

From the foregoing it will be apparent that the entire weight of the centrifugal bowl is supported on a driving spindle that is in itself flexible and is firmly connected to the bowl and is supported for angular misalignment with respect to the driving member that rotates it. It will be observed that means is provided for guiding or centering the lower end of the bowl, such means being termed a "drag". Motion of the drag member radially with respect to the axis of the bowl is frictionally resisted and that motion, and particularly any motion of the drag to a limiting position, is cushioned.

There is preferably provided between the bowl boss 20 and the drag bushing 34 a clearance that is approximately great enough to permit the boss of the bowl, without contacting bushing 34, to rotate eccentrically of its geometrical axis to such extent as is due to any lack of physical balance in the bowl or the bowl spindle or the connecting means between the bowl and the spindle. Under such conditions the geometrical axis may be eccentric to the principal axis causing the boss to rotate eccentric to its geometrical axis when the rotating bowl is empty or free of eccentrically collected solids, and internal diameter of bushing 34 will be equal to or exceed the diameter of the path of the outermost point of the eccentrically rotating boss. Then if the eccentricity of the rotation of the boss is increased one side of the boss will contact with the inner face of bushing 34. Thus, in Fig. 5 the circle 60 may represent the location of the inner face of bushing 34 and the circle 61 may represent the outer face of the boss 20. When the outer face of boss 20 contacts the inner face of bushing 34 because of a greater displacement of the bowl due to changes in condition of balance or due to oscillation or precession of the bowl axis or due to other causes, the boss will contact the inner face of the bushing at 62. The boss is rotating in the direction of the arrow 63 in Fig. 5 and the friction produced at contact 62 will produce a reaction in the direction of the arrow 64 and acting upon the axis of the bowl. This reaction will produce a gyroscopic moment in the direction of arrow 65. The gyroscopic moment will tend to force the boss against bushing 34 and this will tend to force the drag ring 29 or ferrule 45 into sharp contact with the inner wall of housing 28. The contacting of the boss with the bushing and the frictional and other forces resulting therefrom tend to cause planetation of the boss within the bushing.

It is my belief, although I do not intend to be bound thereby, that the occurrence of such sharp contacts and of the rebound consequent to such sharp contacts is the cause of the vibration above referred to in centering devices and drags.

An important feature of my invention is that displacement of the guiding member or drag against the frictional resistance opposed to such displacement is cushioned, the limiting of the motion of the drag bushing being in particular sufficiently cushioned to prevent sharp contacts.

In some instances it has been sought to utilize springs to provide yielding supports for bearings of centrifugal rotors or for rigid shafts rigidly connected to centrifugal rotors. If the period of oscillation or vibration coincides with the period of oscillation of such springs, destruction of the machine is likely to occur. However, the springs utilized in accordance with my invention to cushion the movements of a frictionally held drag member, and particularly a drag member that is normally out of contact with the part to be centered or guided, are not to be confused with such yielding supports for bearings.

While efforts have been made to prevent vibration of the centering member by having the drag bushing fit the bowl boss closely and by thoroughly lubricating the contacting surfaces of the boss and the bushing, such efforts, as above stated, have not been effectual in all cases and in any event produce temporary effects. An operational requirement that imposes constructional difficulties is the necessity for having the parts so formed that the bowl is readily removable and replaceable. Also the difficulty of entirely preventing contact of the liquid that is being treated, with the parts of the guiding or centering device imposes a limitation upon the form and material of such devices. If a frictionless yielding bearing could be produced that meets the constructional and operational requirements, an unbalanced bowl might be rotated without vibration, because of the absence of friction. However, waves in the liquid in the bowl would possibly render indispensable a drag action even if it were possible to construct such a frictionless bearing. Experience indicates that the drag action and the cushioning of the lateral movements of the rotor or of parts of the rotating system, are necessitated by the existence of friction even though liquid waves do not exist or could be avoided. Years of experience indicate the desirability of a clearance between the bowl boss and the drag bushing. The drag bushing, particularly when there is a clearance between the bushing and the bowl boss, is not a bearing. It appears, although I do not intend to be bound by the theory, that the friction produced intermittently by the lateral shifting of the bushing is highly desirable in effecting the desired damping of the oscillations and vibrations that must be effected in a centrifugal system that is flexible and supported for swinging.

While I have described in great details certain embodiments and applications of my invention it is to be understood that my invention is not limited to such details but includes such modifications and variations as fall within the appended claims.

I claim:

1. In a centrifugal machine, a rotor, a member mounted for movement and adapted to be moved by the rotor during the oscillations and gyrations thereof, means for frictionally resisting the movement of said member, and means for cushioning the movement of said member.

2. In a centrifugal machine, a rotor, a member mounted for movement and adapted to be moved by the rotor during the oscillations and gyrations thereof, means for frictionally resisting the movement of said member, means for limiting the movement of said member, and means for cushioning the contact of said member and said limiting means.

3. In a centrifugal machine, a rotor, a bushing surrounding a part of the rotor and adapted to be moved by the oscillations and gyrations of the rotor, means for frictionally resisting movement of said bushing, and means cushioning the frictionally resisted movement of said bushing.

4. In a centrifugal machine, a rotor, a spindle for supporting the whole weight of the rotor and its contents, a member adapted to be moved by the oscillations and gyrations of said rotor, means frictionally resisting movement of said member, and means cushioning the movement of said member.

5. In a centrifugal machine, a rotor, a member in spaced relation thereto and adapted to be engaged by said bowl and moved thereby when said bowl gyrates or oscillates, means for frictionally resisting movement of said member, means for limiting movement of said member and means for cushioning engagement of said member with said limiting means.

6. In a centrifugal machine, a rotor, a member surrounding a part thereof in spaced relation and adapted to be engaged and moved by said rotor when it oscillates or gyrates, means for frictionally resisting movement of said member, and means for cushioning movement of said member.

7. In a centrifugal machine, a rotor, a member mounted for movement in a plane normal to the axis of said rotor and adapted to be moved in said plane by said rotor when it oscillates or gyrates, means locking said member against rotation with said rotor, means frictionally resisting motion of said member in said plane, and means cushioning motion of said member in said plane.

8. In a centrifugal machine, a rotor, a member adapted to be moved by said rotor when it oscillates or gyrates means locking said member against rotation with said rotor, means frictionally resisting said movement of said member, and springs resisting movement of said member by said rotor.

9. In a centrifugal machine, a rotor, a member surrounding a part of the rotor and adapted to be moved by the oscillations and gyrations of the rotor, means locking said member against rotation with said rotor, means frictionally resisting movement of said member, and means cushioning movement of said member.

10. In a centrifugal machine, a rotatable system including a centrifugal rotor, a member mounted in spaced relation to and adapted for engagement by a rotatable part of said system, means for frictionally resisting movement of said member, and means for cushioning movement of said member.

11. In a centrifugal machine, a rotatable system including a centrifugal rotor, an annular member in radially spaced relation to and adapted for engagement by an annular part of said system, means for frictionally resisting movement of said member, and means for cushioning movement of said member.

12. In a centrifugal machine, a rotor, a flexible spindle firmly connected to and adapted to support said rotor, means for supporting said spindle for angular motion of its axis, a member in spaced relation to said rotor and adapted to be engaged thereby, means for frictionally resisting movement of said member, and means for cushioning movement of said member.

13. In a centrifugal machine, a flexible rotatable system including a rotor, a member in spaced relation to said system and mounted for movement and adapted to be moved by the oscillations and gyrations of said rotor, and means for cushioning movement of said member.

In testimony whereof, I have signed my name to this specification.

WILMER H. BATH.